United States Patent
Li et al.

(10) Patent No.: US 10,216,183 B2
(45) Date of Patent: Feb. 26, 2019

(54) 3D INTELLIGENT SCHEDULING METHOD BASED ON LOGISTICS SIMULATION SOFTWARE

(71) Applicant: Zhuhai Makerwit Technology Co., Ltd., Zhuhai, Guangdong (CN)

(72) Inventors: Dong Li, Guangxi (CN); Xueyan Zan, Guangdong (CN); Weijie Ruan, Guangdong (CN); Jiancong Zhuo, Guangdong (CN); Liangyin Huang, Guangdong (CN); Gansheng Jiang, Hu'nan (CN)

(73) Assignee: Zhuhai Makerwit Technology Co., Ltd., Zhuhai (CN)

( * ) Notice: Subject to any disclaimer, the term of this patent is extended or adjusted under 35 U.S.C. 154(b) by 181 days.

(21) Appl. No.: 15/257,860

(22) Filed: Sep. 6, 2016

(65) Prior Publication Data
US 2018/0017964 A1    Jan. 18, 2018

(30) Foreign Application Priority Data

Jul. 18, 2016    (CN) .......................... 2016 1 0569418

(51) Int. Cl.
*G05D 1/00*    (2006.01)
*G05B 17/02*    (2006.01)
(Continued)

(52) U.S. Cl.
CPC ........... *G05D 1/0022* (2013.01); *G05B 17/02* (2013.01); *G06Q 50/28* (2013.01); *G09B 19/00* (2013.01);
(Continued)

(58) Field of Classification Search
CPC combination set(s) only.
See application file for complete search history.

(56) References Cited

U.S. PATENT DOCUMENTS

2010/0077377 A1*    3/2010    Pegden .................... G06F 8/10
                                                                  717/105

FOREIGN PATENT DOCUMENTS

JP    1994137005    *    8/1996    ............. B65G 43/00
KR    101549505 B1    *    9/2015

OTHER PUBLICATIONS

KR101549505—English translation, 2015.*
JP1994137005A—(Pub—JP 08002648 A)—english translation 1996.*

* cited by examiner

*Primary Examiner* — Anne M Antonucci
*Assistant Examiner* — Renee LaRose

(57) ABSTRACT

A 3D intelligent scheduling method based on logistics simulation software includes: establishing a logistics simulation model; establishing a link to an AGV and an automated equipment by using a network communications module; sending, a logistics task to a scheduling control server by using the network communications module, where the logistics task of the AGV triggers the logistics simulation model, and the logistics simulation model starts to run and calculate; obtaining, a traveling route of the AGV through calculation, and triggering a simulated AGV corresponding to the AGV; sending, an analog control signal to the simulated AGV; extracting the analog control signal, converting the analog control signal to a control signal the AGV can recognize, and sending the control signal to the AGV by using the network communications module; and performing a corresponding action according to the received control signal, to complete the logistics task.

7 Claims, 1 Drawing Sheet

(51) Int. Cl.
*G09B 19/00* (2006.01)
*H04W 4/80* (2018.01)
*G06Q 50/28* (2012.01)
*G09B 9/00* (2006.01)

(52) U.S. Cl.
CPC ..... *G09B 19/0053* (2013.01); *G09B 19/0069* (2013.01); *H04W 4/80* (2018.02); *G09B 9/00* (2013.01)

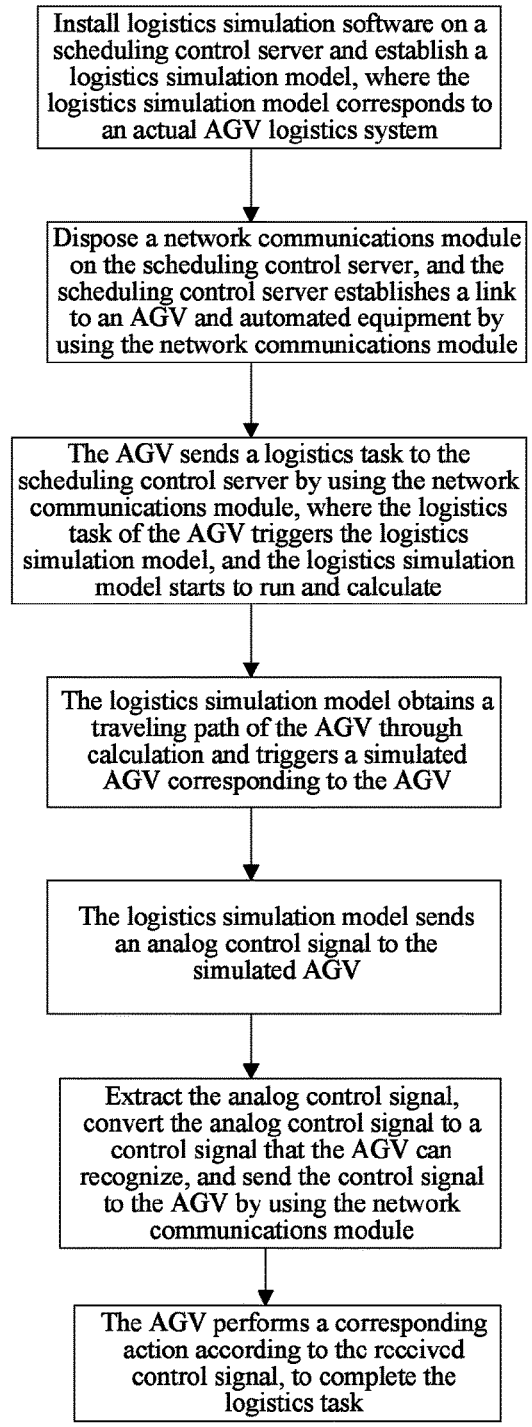

3D INTELLIGENT SCHEDULING METHOD BASED ON LOGISTICS SIMULATION SOFTWARE

CROSS-REFERENCE TO PRIOR APPLICATION

This application claims the benefit of Chinese Patent Application No. 201610569418.3 filed on Jul. 18, 2016, the contents of which are incorporated herein by reference.

TECHNICAL FIELD

The present invention relates to the field of logistics simulation technologies, and in particular, to a 3D intelligent scheduling method based on logistics simulation software.

BACKGROUND ART

A conventional logistics simulation system merely virtually triggers a discrete event according to related production data or a customized correlated condition, and analyzes possible or potential data in real production by virtually running, so as to resolve most evaluation problems and bottleneck problems according to previous rules or empirical values. However, relatively large uncertainty exists in a relationship between an analysis result and actual running because a production condition changes dramatically and the simulation system is totally independent of a real-time production condition.

Many logistics management (scheduling) systems can collect real-time data only after being totally jointed with reality, and calculate an actual scheduling manner of production by using the real-time data. Therefore, many evaluation mechanisms and bottleneck problems cannot be prevented in advance, and optimization and improvement can be performed only after the systems run for some time, thereby causing increasing investment of human and material resources.

Some enterprises first use logistics simulation software to perform optimization with respect to production-related problems, and then control a logistics system by using a real-time scheduling system. It seems that the problems in the foregoing two aspects are resolved. However, a related algorithm and a trigger condition of simulation software cannot totally match a related algorithm and a trigger condition of an actual control system, and differences therebetween cause that the two are independent of each other and an expected objective cannot be achieved.

SUMMARY OF THE INVENTION

The present invention provides a 3D intelligent scheduling method based on logistics simulation software and resolves a problem that a related algorithm and a trigger condition of logistics simulation software cannot totally match a related algorithm and a trigger condition of an actual control system.

A technical solution of the present invention is implemented in this way:

A 3D intelligent scheduling method based on logistics simulation software specifically includes the following steps:

step 1: installing logistics simulation software on a scheduling control server, and establishing a logistics simulation model, where the logistics simulation model corresponds to an actual AGV logistics system, the AGV logistics system includes an AGV, an automated equipment, and several card-reading points, and the card-reading points are distributed on an AGV path;

step 2: disposing a network communications module on the scheduling control server, and establishing, by the scheduling control server, a link to the AGV and the automated equipment by using the network communications module;

step 3: sending, by the AGV, a logistics task to the scheduling control server by using the network communications module, where the logistics task of the AGV triggers the logistics simulation model, and the logistics simulation model starts to run and calculate;

step 4: obtaining, by the logistics simulation model, a traveling route of the AGV through calculation, and triggering a simulated AGV corresponding to the AGV;

step 5: sending, by the logistics simulation model, an analog control signal to the simulated AGV;

step 6: extracting the analog control signal, converting the analog control signal to a control signal that the AGV can recognize, and sending the control signal to the AGV by using the network communications module; and step 7: performing, by the AGV, a corresponding action according to the received control signal, to complete the logistics task.

Further, the logistics simulation model includes two stages: a simulation stage and a control stage; and in the simulation stage, the logistics simulation model is triggered by simulation parameters of the simulated AGV and the simulated automated equipment.

Further, the following steps are also included:

if the logistics task of the AGV needs to be performed in cooperation with the automated equipment, sending, by the automated equipment, a signal to the scheduling control server by using the network communications module to trigger the logistics simulation model, and triggering, by the logistics simulation model, the simulated automated equipment corresponding to the automated equipment and sending an analog control signal to the simulated automated equipment; and extracting the analog control signal, converting the analog control signal to a control signal that the automated equipment can recognize, and sending the control signal to the automated equipment.

Further, the automated equipment includes a roller line, an automatic door, an elevator, a belt conveyor line, a robot, an automated production equipment, and a customized physical equipment.

Further, the automated equipment is connected to an automated equipment call terminal, where the automated equipment call terminal exchanges data with the network communications module through a route.

Further, the following steps are also included:

disposing a first card-reading point at a crosspoint of two AGV paths, respectively disposing four card-reading points of which every two are connected to one another on the two AGV paths, where the four card-reading points include a second card-reading point, a third card-reading point, a fourth card-reading point, and a fifth card-reading point; and performing traffic control on an area that is surrounded by the second card-reading point, the third card-reading point, the fourth card-reading point, and the fifth card-reading point, where a method for the traffic control specifically includes the following steps:

entering, by a first AGV, a traffic control area, reading a card at any one of the second card-reading point, the third card-reading point, the fourth card-reading point, and the fifth card-reading point, sending, by the card-reading point, card-reading information of the first AGV to the logistics simulation model, where a simulated first AGV corresponding to the first AGV and simulated card-reading points corresponding to the second card-reading point, the third card-reading point, the fourth card-reading point, and the fifth card-reading point are provided in the logistics simulation model, driving the simulated first AGV to reach a corresponding simulated reading point and sending an analog control instruction to the simulated first AGV, reading the analog control instruction, converting the analog control instruction to a control signal that the first AGV can recognize, and sending the control signal to the first AGV by using the network communications module;

if the first AGV has not left the traffic control area, reading, by a second AGV, a card at any one of the second card-reading point, the third card-reading point, the fourth card-reading point, and the fifth card-reading point, sending, by the card-reading point, card-reading information of the second AGV to the logistics simulation model, where a simulated second AGV corresponding to the second AGV is provided in the logistics simulation model, driving the second AGV to reach a corresponding simulated card-reading point, and suspending sending the analog control instruction to the simulated second AGV; and after the first AGV leaves the traffic control area, controlling, by the logistics simulation model, the second AGV to continue moving forward.

Further, the network communications module uses one or more of the following communication modes: WiFi, ZigBee, Bluetooth, CDMA2000, GSM, infrared, ISM, RFID, UMTS/3GPPw/HSDPA, and UWB.

Further, the logistics simulation software is one of FlexSim, Demo3D, RaLC, Anylogic, ExtendSim, Arena, AutoMod, Simio, Witness, and eM-Plant.

Beneficial effects of the present invention are: An actual AGV logistics system sends a trigger signal to a logistics simulation model, the logistics simulation model performs calculation and analysis and extracts an analog control instruction of the logistics simulation model to the AGV logistics system, thereby resolving a problem that a related algorithm and a trigger condition of logistics simulation software cannot totally match a related algorithm and a trigger condition of an actual control system.

BRIEF DESCRIPTION OF THE DRAWINGS

To describe the technical solutions in the embodiments of the present invention or the prior art more clearly, the accompanying drawing that needs to be used in description of the embodiments or the prior art is briefly described below. Apparently, the accompanying drawing in the following description merely illustrates some embodiments of the present invention, and a person of ordinary skill in the art may still derive other drawings from the accompanying drawing without paying creative efforts.

The FIGURE is a flowchart of a 3D intelligent scheduling method based on logistics simulation software according to the present invention.

DETAILED DESCRIPTION OF THE PREFERRED EMBODIMENTS

The following clearly and completely describes the technical solutions in the embodiments of the present invention with reference to the accompanying drawing in the embodiments of the present invention. Apparently, the described embodiments are some embodiments of the present invention rather than all of the embodiments of the present invention. All other embodiments obtained by a person of ordinary skill in the art based on the embodiments of the present invention without paying creative efforts shall fall within the protection scope of the present invention.

The AGV is an abbreviation of the automated guided vehicle and refers to a vehicle that is equipped with an electromagnetic automated guiding apparatus, an optical automated guided apparatus, or the like and capable of traveling along a specified guided path and that has safety protection and various transferring functions. The AGV belongs to a category of wheeled mobile robots (WMRs).

As shown in the FIGURE, the present invention provides a 3D intelligent scheduling method based on logistics simulation software, specifically including the following steps:

Step 1: Install logistics simulation software on a scheduling control server, and establish a logistics simulation model, where the logistics simulation model corresponds to an actual AGV logistics system, and the AGV logistics system refers to an automated logistics system based on an AGV; the AGV logistics system includes an AGV, automated equipment, and several card-reading points, and the card-reading points are distributed on an AGV path; and the AGV path refers to a fixed path that the AGV needs to travel during a transportation process. The card-reading points are configured to record each AGV that passes by.

The automated equipment includes a roller line, an automatic door, an elevator, a belt conveyor line, a robot, an automated production equipment, and a customized physical equipment.

Step 2: Dispose a network communications module on the scheduling control server, and the scheduling control server establishes a link to the AGV and the automated equipment by using the network communications module.

The automated equipment is connected to an automated equipment call terminal, where the automated equipment call terminal exchanges data with the network communications module through a route.

Step 3: The AGV sends a logistics task to the scheduling control server by using the network communications module, where the logistics task of the AGV triggers the logistics simulation model, and the logistics simulation model starts to run and calculate.

Step 4: The logistics simulation model obtains a traveling path of the AGV through calculation and triggers a simulated AGV corresponding to the AGV.

Step 5: The logistics simulation model sends an analog control signal to the simulated AGV.

Step 6: Extract the analog control signal, convert the analog control signal to a control signal that the AGV can recognize, and send the control signal to the AGV by using the network communications module.

Step 7: The AGV performs a corresponding action according to the received control signal, to complete the logistics task.

Specifically, the logistics simulation model includes two stages: a simulation stage and a control stage.

In the simulation stage, the logistics simulation model is triggered by simulation parameters of the simulated AGV and the simulated automated equipment.

In the simulation stage, each discrete event is triggered by an internal virtual parameter (for example, a production plan parameter, a long-term production empirical value, or a signal generated in a manner such as a random number), which causes that the logistics simulation model runs continuously and analyzes related data.

In the control stage, the same logistics simulation model is still used and only the internal virtual parameter thereof is canceled. Various signals of real production equipment are transmitted to the logistics simulation model in a wireless communication manner, so as to trigger the logistics simulation model to continuously run. During a running process, the logistics simulation model obtains an analog control instruction by means of analysis, and transmits the analog control instruction to corresponding equipment, such as the AGV or the automated equipment, in a wireless communications manner, so as to implement an organic combination between virtual simulation and real control.

In conclusion, a model, an algorithm, and a trigger condition of simulation are completely identical to those of control, and only sources of trigger signals are different, which perfectly resolves three important questions involved in the background art.

The following step of the method can be used for connecting the logistics simulation software and the AGV or the automated equipment to exchange data:

developing a DLL file based on the TCP/IP protocol, mainly including: server connection (ilnsConnect) and server disconnection (ilnsClose).

A programming example of the server connection is as follows:

```
WORD wVersionRequested = MAKEWORD(1, 1);
    WSADATA wsaData;
    if    (WSAStartup(wVersionRequested, &wsaData) != 0)
    {
        MessageBox(NULL,
            TEXT ("prompt: fail to initialize Winsock!"),
            TEXT ("message (watchdog)"), 0);
        return 0;
    }
    sockClient = socket(AF_INET, SOCK_STREAM, 0);
    SOCKADDR_IN addrSrv;
    addrSrv.sin_family = AF_INET;
    addrSrv.sin_addr.S_un.S_addr = inet_addr(ServerIP);
    addrSrv.sin_port = htons(stringtonum(ConnectPort));
    int rs = connect(sockClient, (SOCKADDR*)&addrSrv,
    sizeof(SOCKADDR));
    if (rs < 0)
    {
        MessageBox(NULL,
            TEXT ("prompt: server connection failed, please check
configuration files: IP address, port number."),
            TEXT ("message (watchdog)"), 0);
        return 0;
    }
    else
        ConnectSuccess = true;
```

A preferred embodiment of the present invention further includes the following steps:

if the logistics task of the AGV needs to be performed in cooperation with the automated equipment, sending, by the automated equipment, a signal to the scheduling control server by using the network communications module to trigger the logistics simulation model, and triggering, by the logistics simulation model, the simulated automated equipment corresponding to the automated equipment and sending an analog control signal to the simulated automated equipment; and extracting the analog control signal, converting the analog control signal to a control signal that the automated equipment can recognize, and sending the control signal to the automated equipment.

For example, control information is extracted from the logistics simulation model for controlling equipment in reality. In the logistics simulation model, when the simulated AGV moves to a simulated automatic door and needs to pass through the simulated automatic door, a trigger signal—a door-opening signal is provided to the simulated automatic door. At this time, the trigger signal (namely, the door-opening signal) in the logistics simulation model is extracted and converted to communications protocol content corresponding to the automated equipment, and a control signal—a door-opening signal is sent to a corresponding automatic door in reality in a wireless manner, so as to implement a function of controlling a physical object by using simulation.

The preferred embodiment of the present invention is as follows:

a card-reading point is disposed at a crosspoint of two AGV paths, the card-reading point is a first card-reading point, the two AGV paths are respectively provided with two card-reading points that are adjacent to the first card-reading point and that respectively are: a second card-reading point, a third card-reading point, a fourth card-reading point, and a fifth card-reading point, and an area surrounded by the first card-reading point, the second card-reading point, the third card-reading point, the fourth card-reading point, and the fifth card-reading point is a traffic control area; and a traffic control method of the traffic control area specifically includes the following steps:

entering, by a first AGV, a traffic control area, reading a card at any one of the second card-reading point, the third card-reading point, the fourth card-reading point, and the fifth card-reading point, sending, by the card-reading point, card-reading information of the first AGV to the logistics simulation model, where a simulated first AGV corresponding to the first AGV and simulated card-reading points corresponding to the second card-reading point, the third card-reading point, the fourth card-reading point, and the fifth card-reading point are provided in the logistics simulation model, driving the simulated first AGV to reach a corresponding simulated reading point and sending an analog control instruction to the simulated first AGV, reading the analog control instruction, converting the analog control instruction to a control signal that the first AGV can recognize, and sending the control signal to the first AGV by using the network communications module;

if the first AGV has not left the traffic control area, reading, by a second AGV, a card at any one of the second card-reading point, the third card-reading point, the fourth card-reading point, and the fifth card-reading point, sending, by the card-reading point, card-reading information of the second AGV to the logistics simulation model, where a simulated second AGV corresponding to the second AGV is provided in the logistics simulation model, driving the second AGV to reach a corresponding simulated card-reading point, and suspending sending the analog control instruction to the simulated second AGV; and after the first AGV leaves the traffic control area, controlling, by the logistics simulation model, the second AGV to continue moving forward.

The network communications module uses one or more of the following communication modes: WiFi, ZigBee, Bluetooth, CDMA2000, GSM, infrared, ISM, RFID, UMTS/3GPPw/HSDPA, and UWB.

The logistics simulation software is one of FlexSim, Demo3D, RaLC, Anylogic, ExtendSim, Arena, AutoMod, Simio, Witness, and eM-Plant.

The present invention is further provided with a handheld touch call maker terminal that is manually operated. A logistics task can be manually issued, sent to the scheduling control server in a wireless transmission manner, and converted to a signal that the logistics simulation model can recognize. The logistics simulation model controls the simulated AGV or automated equipment according to the signal, extracts and converts a control instruction of the logistics simulation model, and then can control the actual AGV or automated equipment.

Specifically, the logistics simulation model may also calculate an optimal path of the AGV according to the logistics task. For example, when a conveying task from a source 1 to a queue2 is generated, the logistics simulation system automatically selects, according to a simulated AGV 1 and a simulated AGV 2 that are currently available, the simulated AGV 1 that is closest to a node NN1 to execute the task. (The simulated AGV 1 in the logistics simulation model corresponds to an AGV 1 in the real AGV logistics system, and simulation and actual control between the two are correlated with each other.) In this way, the simulated AGV 1 in the logistics simulation model quickly extracts all nodes (NN1→NN9→NN5→NN8→NN2) that need to be passed through in the task from Source1 to Queue2, and the logistics simulation system translates a path and then sends the path to an AGV terminal 1 in the real system in a wireless manner, so as to control the AGV 1 to complete the conveying task according to the path extracted by means of simulation.

The foregoing nodes refer to card-reading points. The source1 and the queue 2 are at two ends of a same horizontal line. The node NN1 and the node NN2 are respectively close to the source 1 and the queue 2. A node NN3 and a node NN4 form a line segment in a vertical direction, and the line segment is perpendicular to the horizontal line segment formed by the node NN1 and the node NN2, where a crosspoint between the two line segments is the node NN5. The horizontal line segment and the vertical line segment are respectively provided with a node NN6 to the node NN9. The node NN6 and the node NN7 are respectively above and below the node NN5, the node NN8 and the node NN9 are respectively on the right and the left of the node NN5, every two of the node NN6 to the node NN9 are connected to one another, and the node NN6 to the node NN9 and the node NN5 form a traffic control area.

Advantages of the Present Invention are:

Economic Effects:

1. System models used in a project planning stage, logistics scheduling system development, and an actual production stage are integrated into one system model, which reduces above 60% of human and material resources invested in iterative development.

2. A running path of an AGV is optimized to the most extent on the basis of a logistics simulation system in combination with real-time control and an optimization algorithm, so as to save investment of AGV carts and associated logistics equipment and reduce investment of enterprise equipment, maintenance personnel and expenses.

Social Effects:

1. The present invention may be used for logistics scheduling in production of an enterprises, and 3D virtual reality matches practical production, thereby enhancing digital and visual management of the enterprises and laying a favorable foundation for upgrading the enterprises toward digital factories.

2. The present invention may be used for college teaching and have functions corresponding to practical operations and practical training for majors such as logistics planning, logistics simulation, automated control, and wireless communications technology. If related majors are integrated for reaching, comprehensive abilities of students may be greatly improved, and the students can be dedicated to enterprise practical production and have preferable practical operation abilities after graduation.

Technical Effects:

1. An organic combination between logistics simulation and an intelligent control system is implemented, so as to achieve a great technical breakthrough.

2. The present invention is of technical guiding significance for involving other simulation systems into practical control application.

3. A seamless joint between mass data analysis and statistics functions of a simulation system and a production management system, such as the EPR, APS, or MES, promotes progress of intelligent manufacturing and digital factories.

What is described above is merely exemplary embodiments of the present invention, and is not intended to limit the present invention. Any modifications, equivalent variations, and improvements made in accordance with the spirits and principles of the present invention shall fall within the protection scope of the present invention.

What is claimed is:

1. A 3D intelligent scheduling method based on a logistics simulation software, comprising:
   installing the logistics simulation software on a scheduling control server, and establishing a logistics simulation model, wherein the logistics simulation model corresponds to an actual AGV (automated guided vehicle) logistics system, the AGV logistics system comprises at least one AGV, an automated equipment, and a plurality of card-reading points, and each of the card-reading points is distributed on an AGV path and is configured to record each AGV that passes by;
   disposing a network communications module on the scheduling control server, and establishing, by the scheduling control server, a link to the at least one AGV and the automated equipment by using the network communications module;
   sending, by the at least one AGV, a logistics task to the scheduling control server by using the network communications module, wherein the logistics task of the at least one AGV triggers a running of the logistics simulation model, wherein the running of the logistics simulation model cause the logistics simulation model to
   obtain a traveling route of the at least one AGV through calculation, and trigger a simulated AGV corresponding to the at least one AGV;
   send an analog control signal to the simulated AGV;
   extract the analog control signal, convert the analog control signal to a control signal capable of being recognized by the at least one AGV, and send the control signal to the at least one AGV by using the network communications module; and
   performing, by the at least one AGV, a corresponding action according to the received control signal, to complete the logistics task;
   wherein when the method is used for a traffic control, the method further comprises:
   disposing a first card-reading point at a crosspoint of two AGV paths, respectively disposing four card-reading points of which every two are connected to one another on the two AGV paths, wherein the four card-reading points comprise a second card-reading point, a third card-reading point, a fourth card-reading point, and a fifth card-reading point; and performing the traffic control on a traffic control area that is surrounded by the second card-reading point, the third card-reading point, the fourth card-reading point, and the fifth card-reading point, wherein performing the traffic control comprises:

entering, by a first AGV, the traffic control area, reading a first card at any one of the second card-reading point, the third card-reading point, the fourth card-reading point, and the fifth card-reading point, and sending, by the card-reading point reading the first card, card-reading information of the first AGV to the logistics simulation model to trigger a first running of the logistics simulation model, wherein a simulated first AGV corresponding to the first AGV and simulated card-reading points corresponding to the second card-reading point, the third card-reading point, the fourth card-reading point, and the fifth card-reading point are provided in the logistics simulation model;

wherein the first running of the logistics simulation model cause the logistics simulation model to drive the simulated first AGV to reach a corresponding simulated reading point and send an analog control instruction to the simulated first AGV, read the analog control instruction, convert the analog control instruction to a control signal capable of being recognized by the first AGV, and send the control signal to the first AGV by using the network communications module;

if the first AGV has not left the traffic control area, reading, by a second AGV, a second card at any one of the second card-reading point, the third card-reading point, the fourth card-reading point, and the fifth card-reading point, sending, by the card-reading point reading the second card, card-reading information of the second AGV to the logistics simulation model to trigger a second running of the logistics simulation model, wherein a simulated second AGV corresponding to the second AGV is provided in the logistics simulation model;

wherein the second running of the logistics simulation model cause the logistics simulation model to drive the second AGV to reach a corresponding simulated card-reading point, and suspend sending the analog control instruction to the simulated second AGV; and after the first AGV leaves the traffic control area, control the second AGV to continue moving forward.

2. The 3D intelligent scheduling method based on the logistics simulation software according to claim 1, further comprising:

if the logistics task of the AGV needs to be performed in cooperation with the automated equipment, sending, by the automated equipment, a signal to the scheduling control server by using the network communications module to trigger a running of the logistics simulation model for the automated equipment, wherein the running of the logistics simulation model for the automated equipment cause to the logistics simulation model to trigger the simulated automated equipment corresponding to the automated equipment and send an analog control signal for the simulated automated equipment to the simulated automated equipment; and extract the analog control signal for the simulated automated equipment, convert the analog control signal for the simulated automated equipment to a control signal capable of being recognized by the automated equipment, and send the control signal capable of being recognized by the automated equipment to the automated equipment.

3. The 3D intelligent scheduling method based on the logistics simulation software according to claim 2, wherein the running of the logistics simulation model for the automated equipment comprises two stages: a simulation stage and a control stage; and in the simulation stage, the logistics simulation model is triggered by simulation parameters of the simulated AGV and the simulated automated equipment corresponding to the automated equipment.

4. The 3D intelligent scheduling method based on the logistics simulation software according to claim 2, wherein the automated equipment comprises a roller line, an automatic door, an elevator, a belt conveyor line, a robot, an automated production equipment, and a customized physical equipment.

5. The 3D intelligent scheduling method based on the logistics simulation software according to claim 4, wherein the automated equipment is connected to an automated equipment call terminal, and the automated equipment call terminal exchanges data with the network communications module through a route.

6. The 3D intelligent scheduling method based on the logistics simulation software according to claim 1, wherein the network communications module uses one or more of the following communication method: WiFi, ZigBee, Bluetooth, CDMA2000, GSM, infrared, ISM, RFID, UMTS/3GPPw/HSDPA, and UWB.

7. The 3D intelligent scheduling method based on the logistics simulation software according to claim 1, wherein the logistics simulation software is one of FlexSim, Demo3D, RaLC, Anylogic, ExtendSim, Arena, AutoMod, Simio, Witness, and eM-Plant.

* * * * *